J. R. GRUETTER.
BOTTLE CLEANING APPARATUS.
APPLICATION FILED APR. 17, 1912.
1,313,814.
Patented Aug. 19, 1919.
12 SHEETS—SHEET 1.
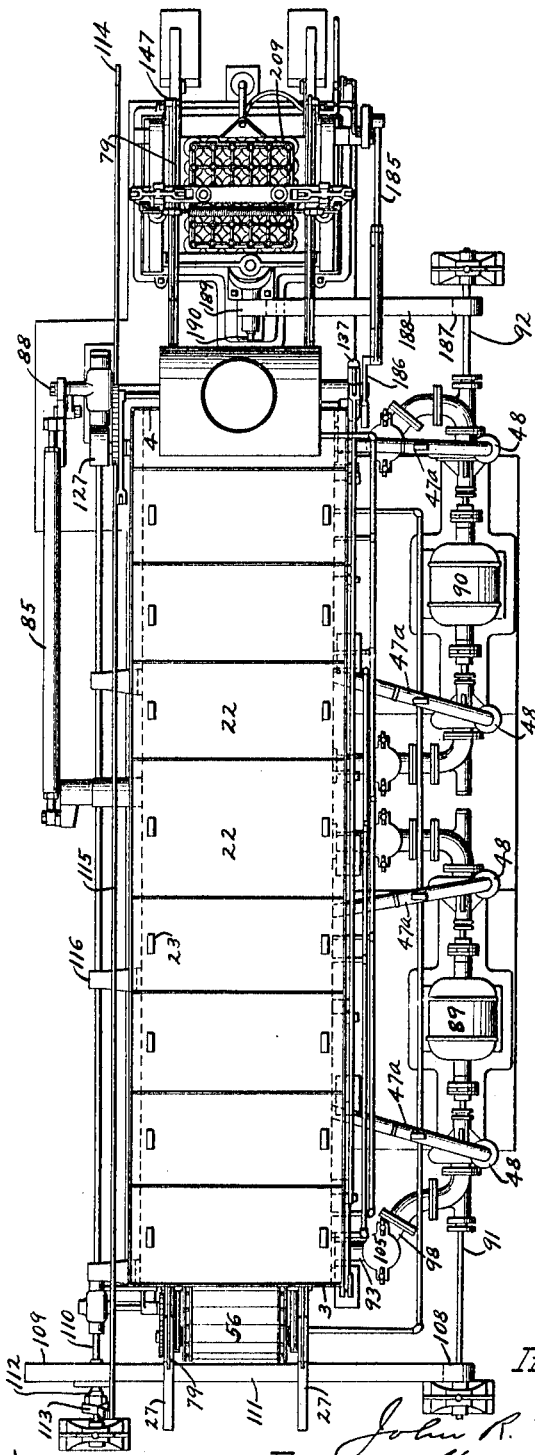

J. R. GRUETTER.
BOTTLE CLEANING APPARATUS.
APPLICATION FILED APR. 17, 1912.
1,313,814.
Patented Aug. 19, 1919.
12 SHEETS—SHEET 2.
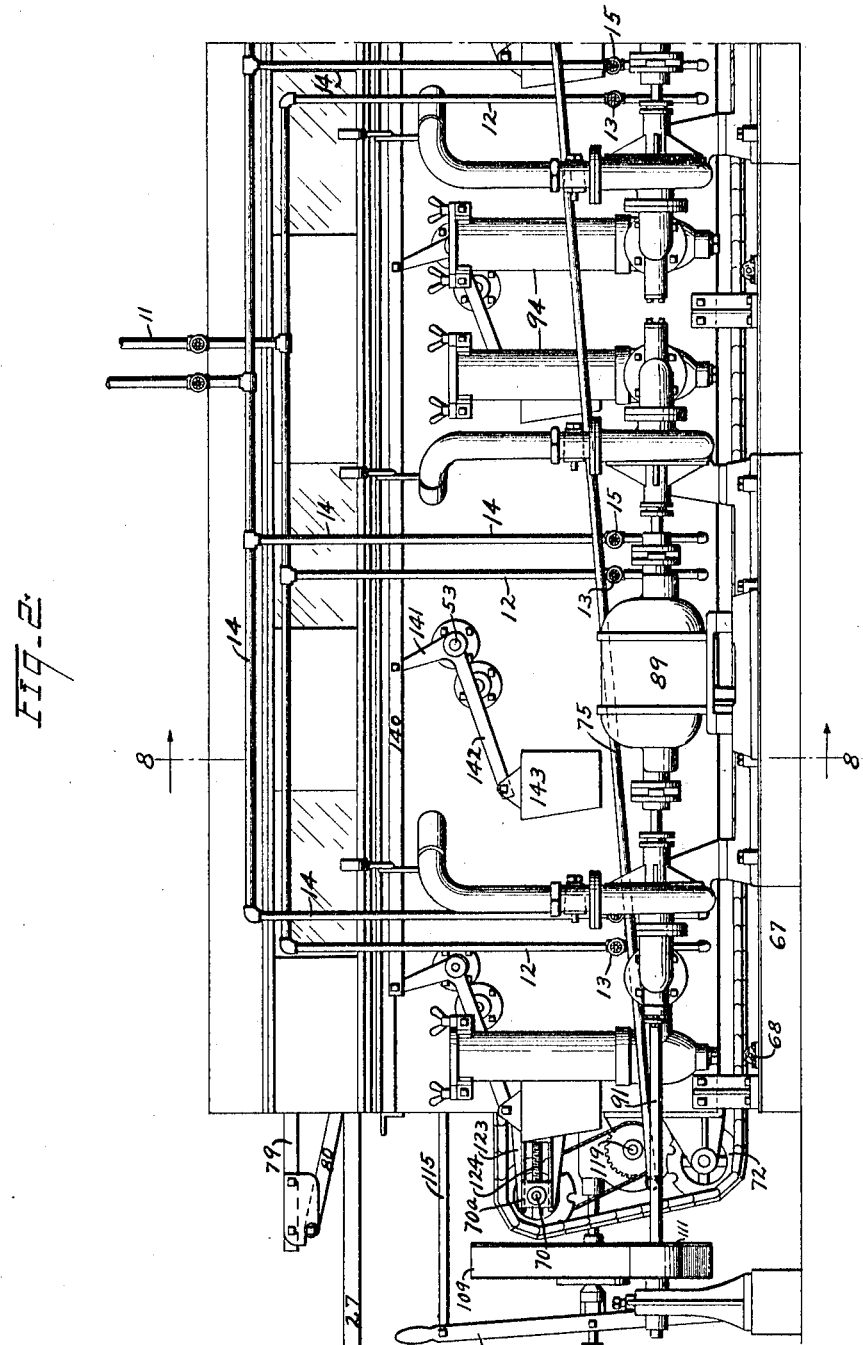
Witnesses:
A. McIntyre
Brennan B. West
Inventor
John R. Gruetter,
Hull & Smith,
Attys.

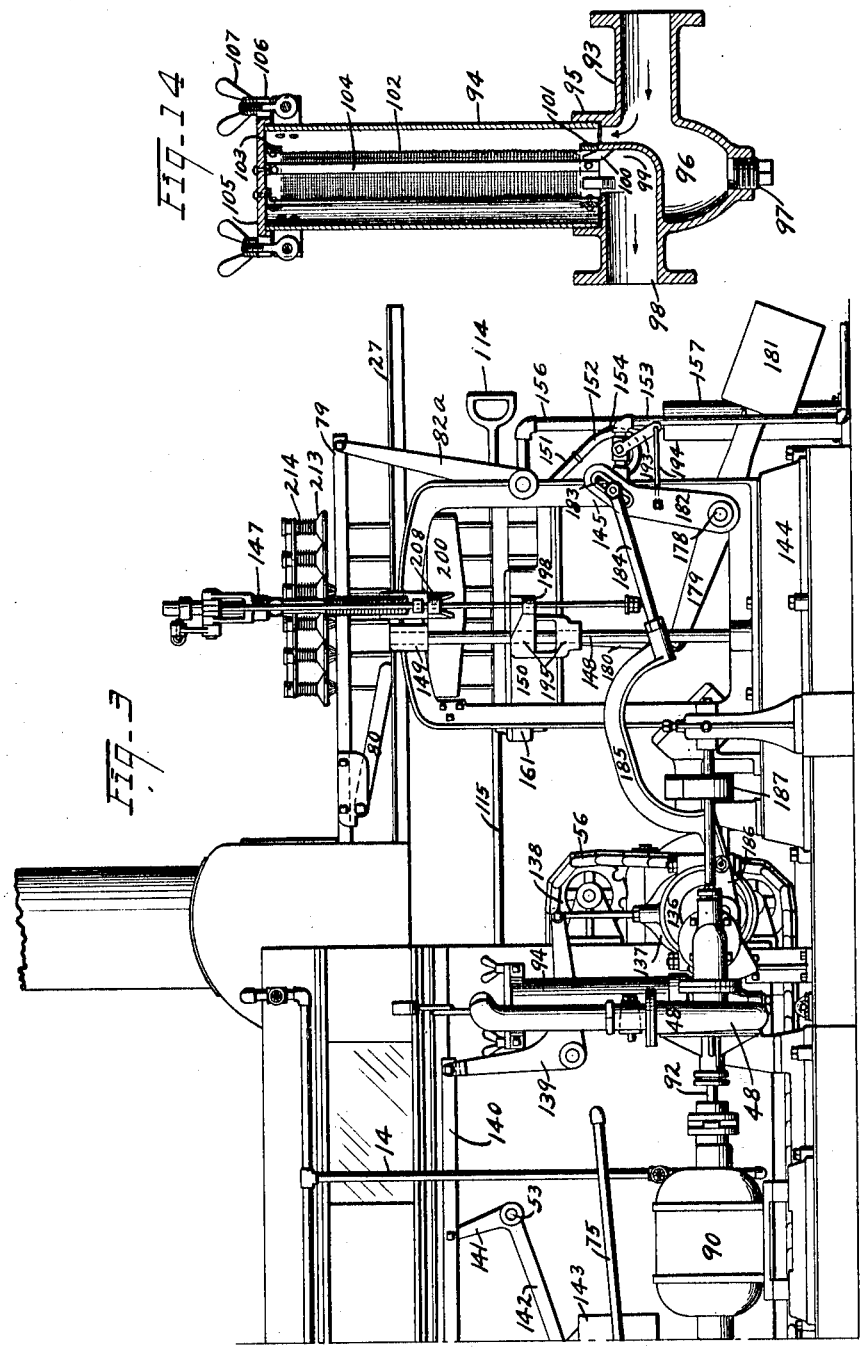

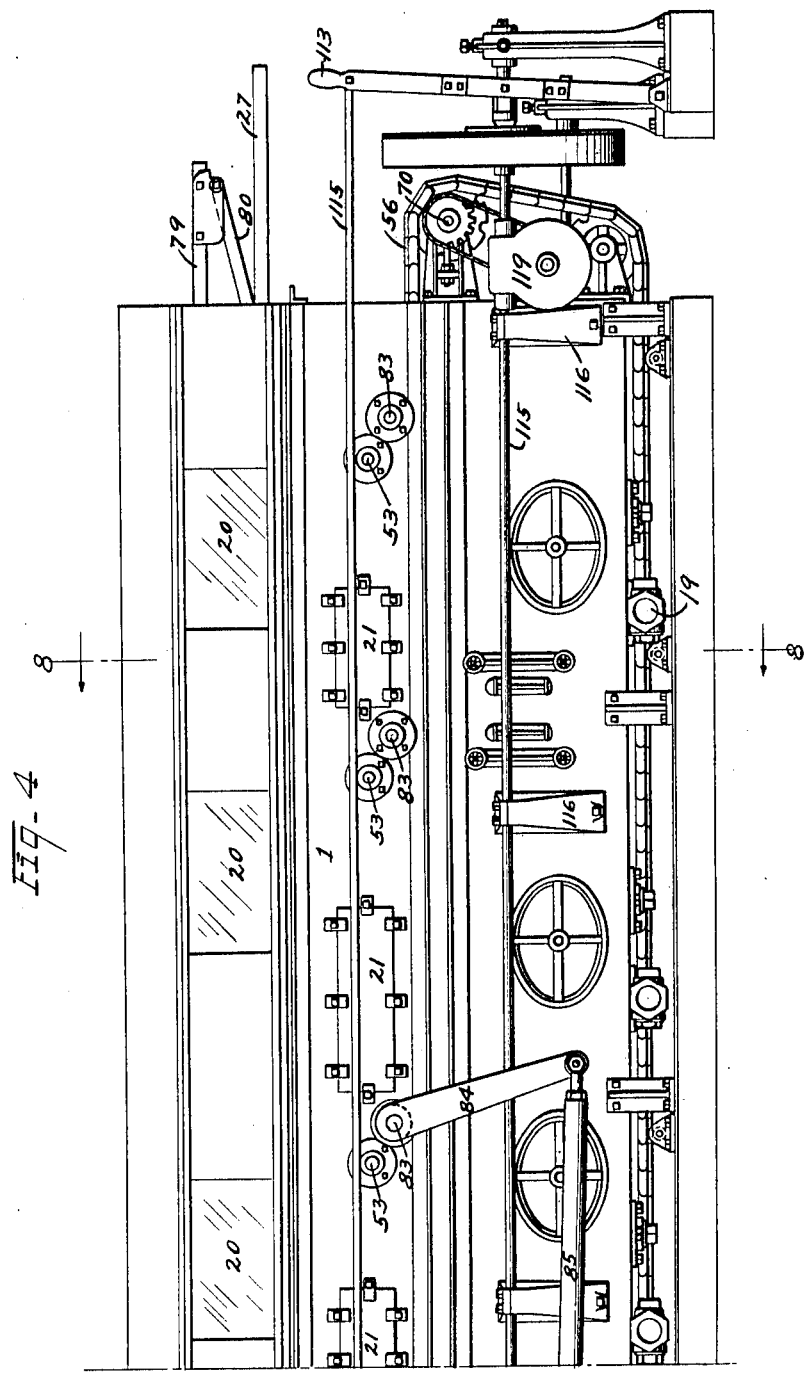

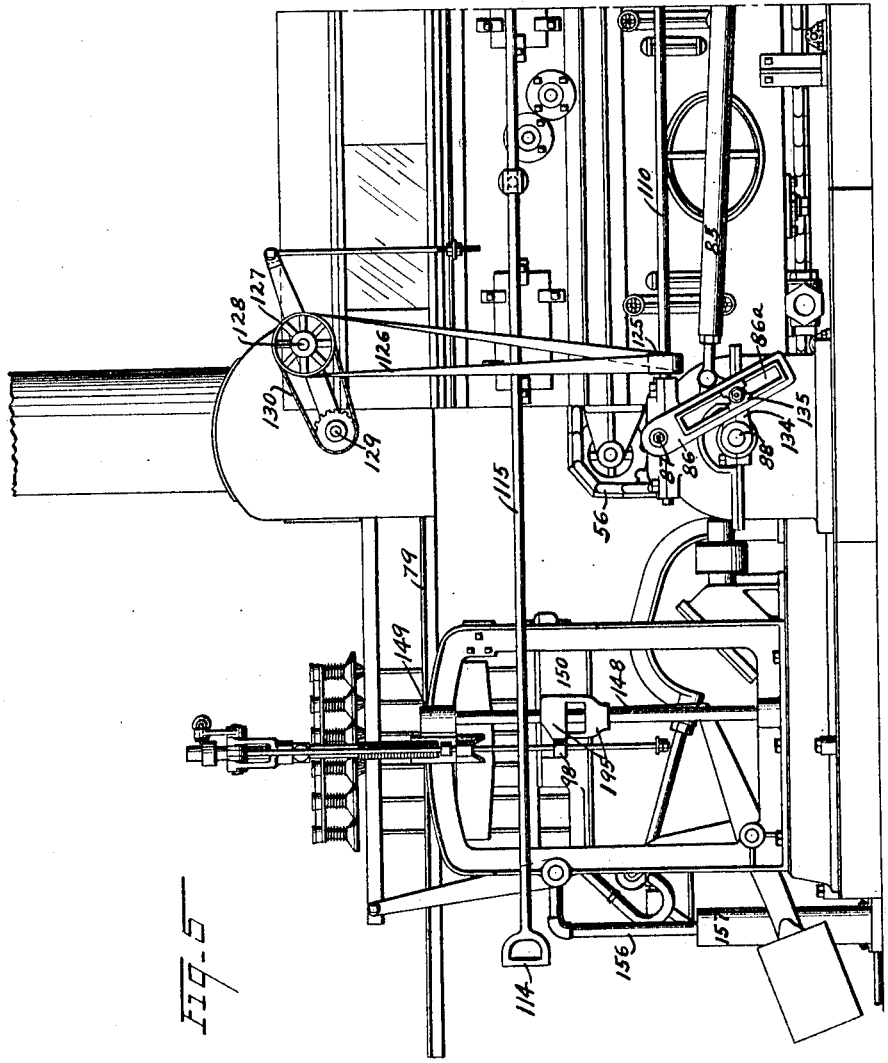

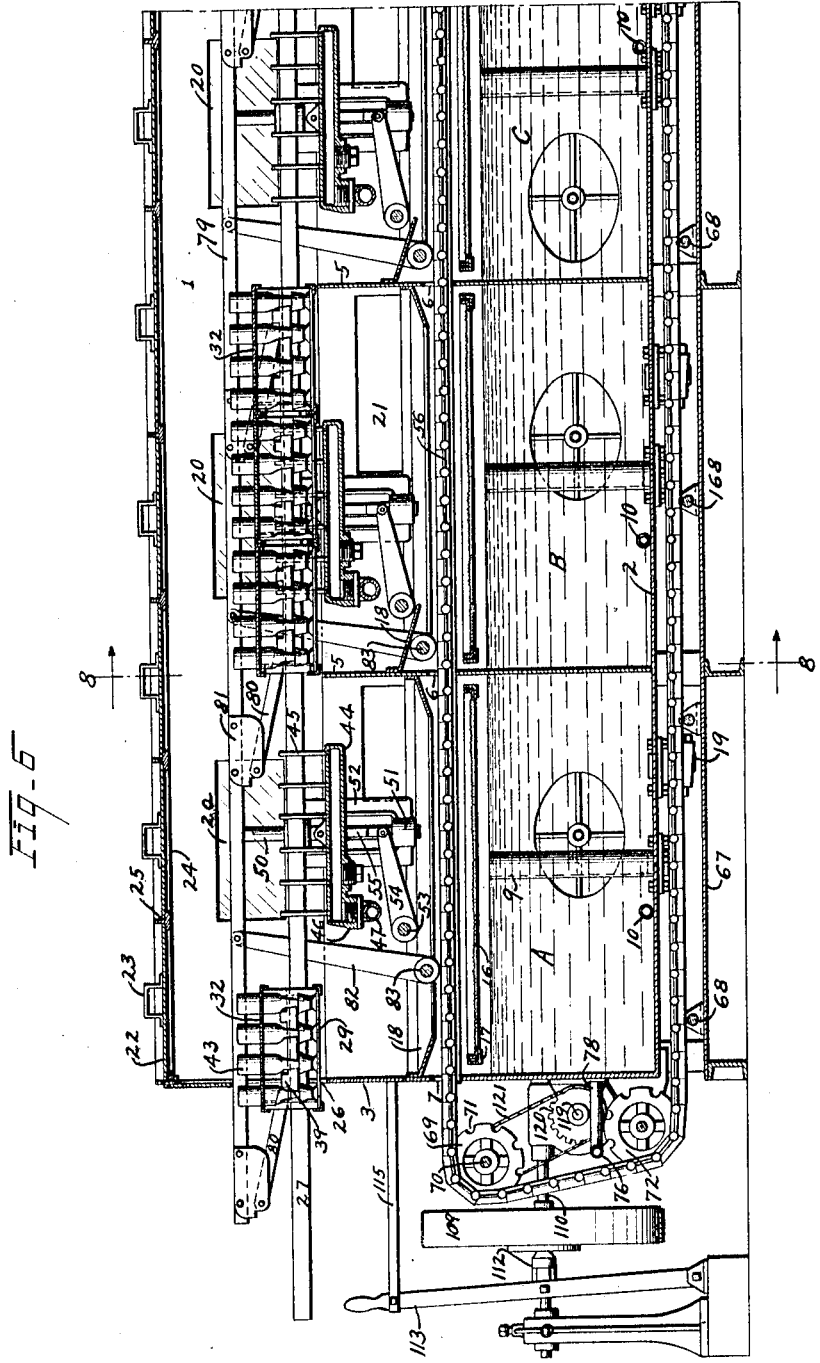

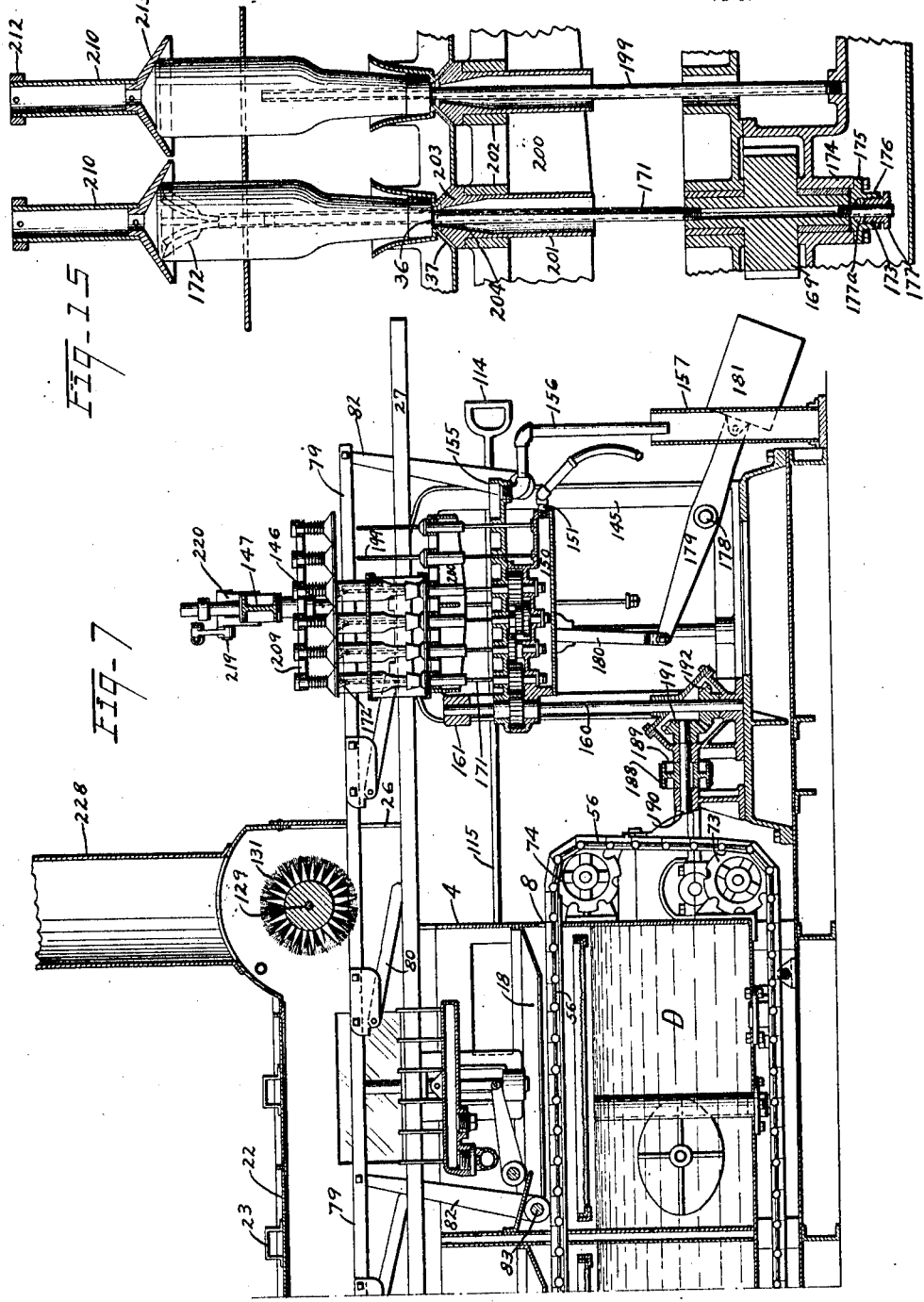

J. R. GRUETTER.
BOTTLE CLEANING APPARATUS.
APPLICATION FILED APR. 17, 1912.
1,313,814.
Patented Aug. 19, 1919.
12 SHEETS—SHEET 8.
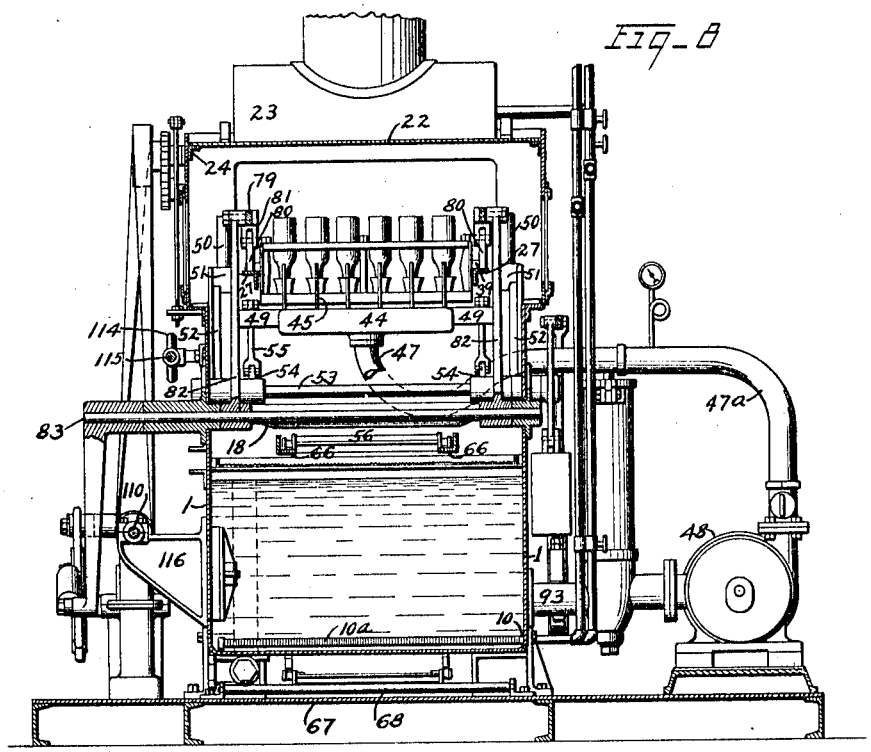
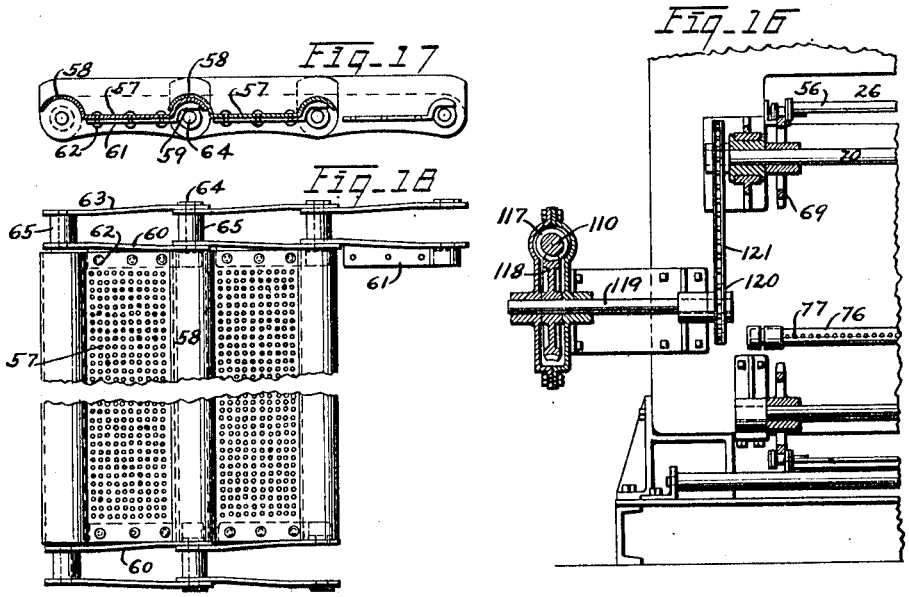
Witnesses:
J. A. McIntyre
Inventor
John R. Gruetter,
By Hull & Smith,
Attys.

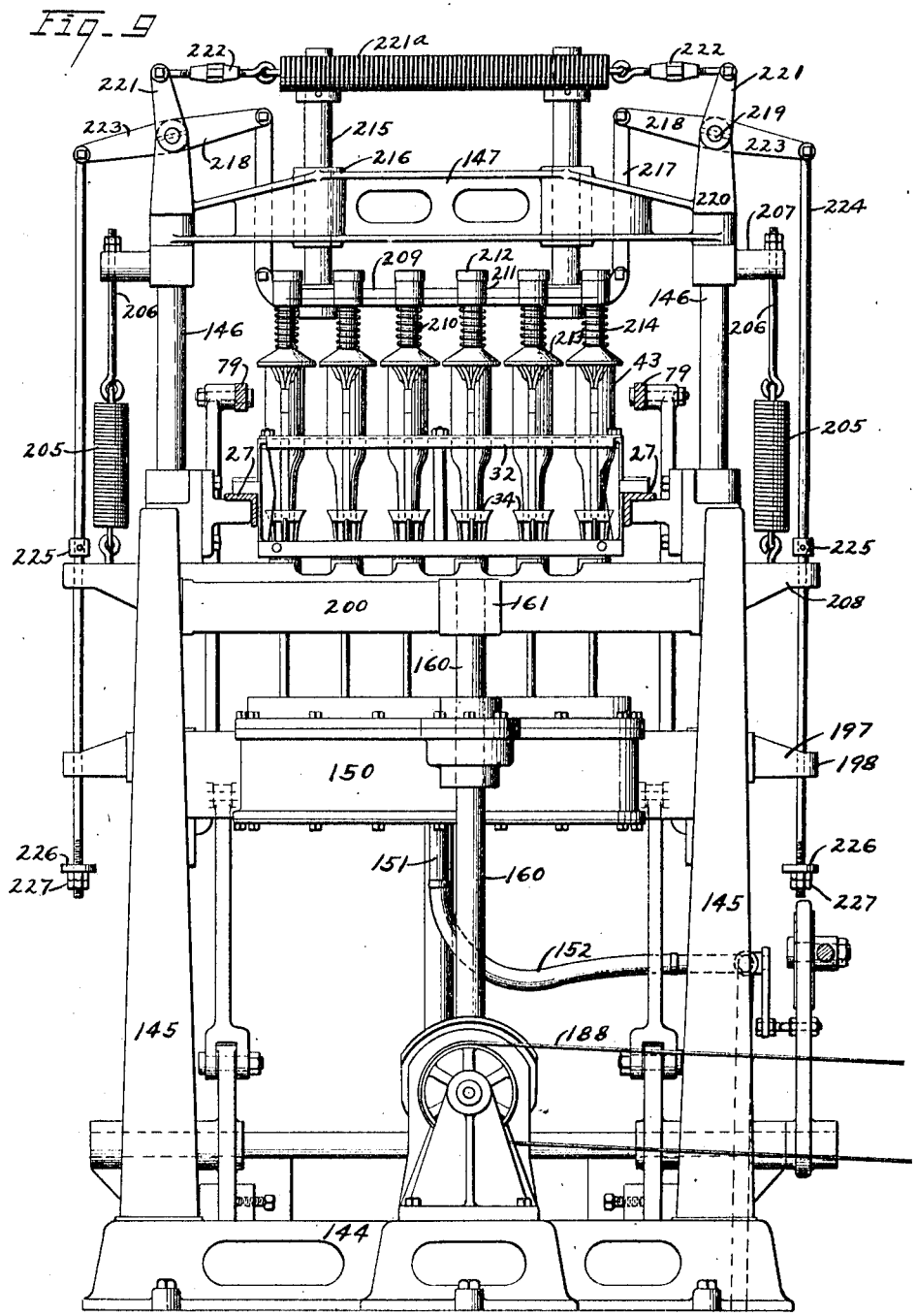

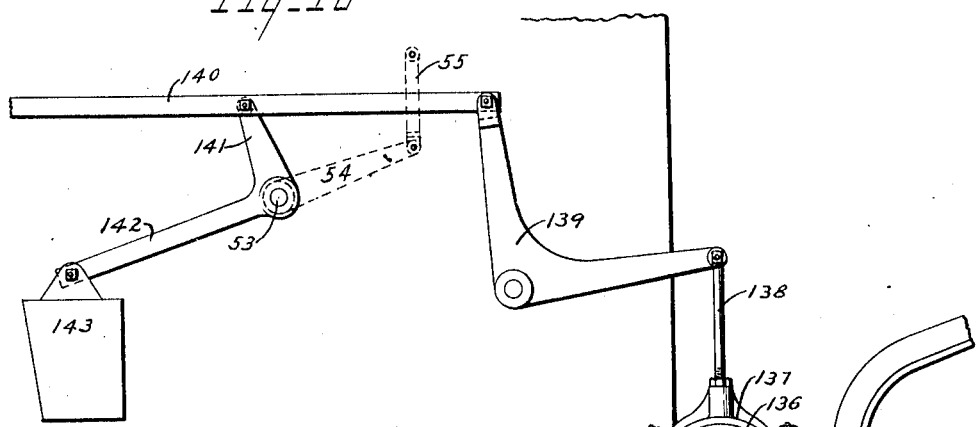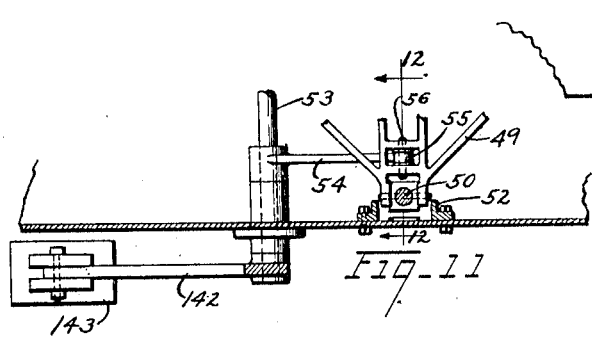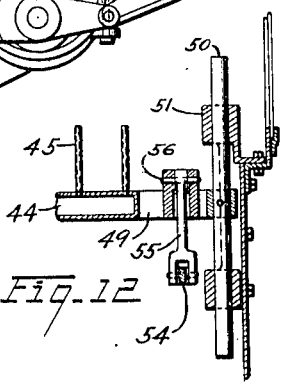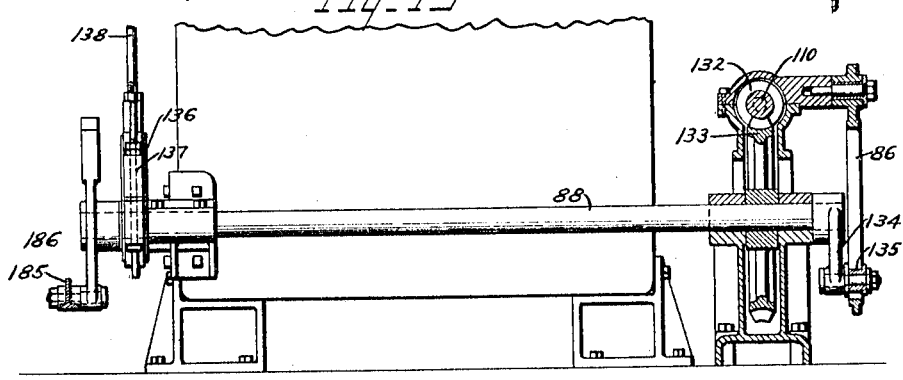

J. R. GRUETTER.
BOTTLE CLEANING APPARATUS.
APPLICATION FILED APR. 17, 1912.

1,313,814.

Patented Aug. 19, 1919.
12 SHEETS—SHEET 11.

Witnesses:
J. A. McIntyre

Inventor
John R. Gruetter.
By Hull & Smith
Attys.

J. R. GRUETTER.
BOTTLE CLEANING APPARATUS.
APPLICATION FILED APR. 17, 1912.

1,313,814.

Patented Aug. 19, 1919.
12 SHEETS—SHEET 12.

Witnesses:
J. A. McIntyre
Brennan B. West

Inventor
John R. Gruetter,
By Hull & Smith,
Attys.

UNITED STATES PATENT OFFICE.

JOHN R. GRUETTER, OF CLEVELAND, OHIO, ASSIGNOR TO THE LOEW MANUFACTURING COMPANY, OF CLEVELAND, OHIO, A CORPORATION OF OHIO.

BOTTLE-CLEANING APPARATUS.

1,313,814.      Specification of Letters Patent.      Patented Aug. 19, 1919.

Application filed April 17, 1912. Serial No. 691,478.

*To all whom it may concern:*

Be it known that I, JOHN R. GRUETTER, a citizen of the United States, residing at Cleveland, in the county of Cuyahoga and State of Ohio, have invented a certain new and useful Improvement in Bottle-Cleaning Apparatus, of which the following is a full, clear, and exact description, reference being had to the accompanying drawings.

Figure 19:
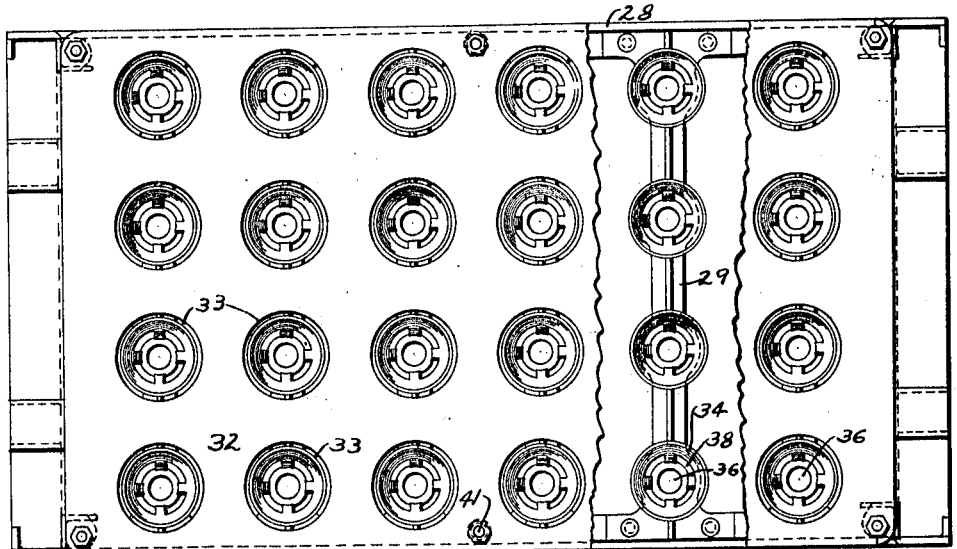
Figure 20:
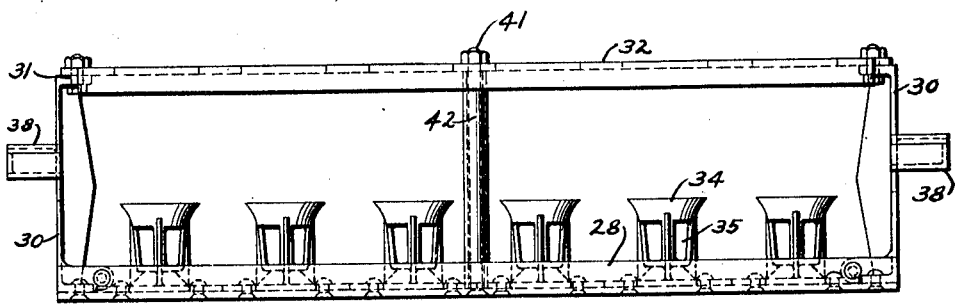
Figure 21:
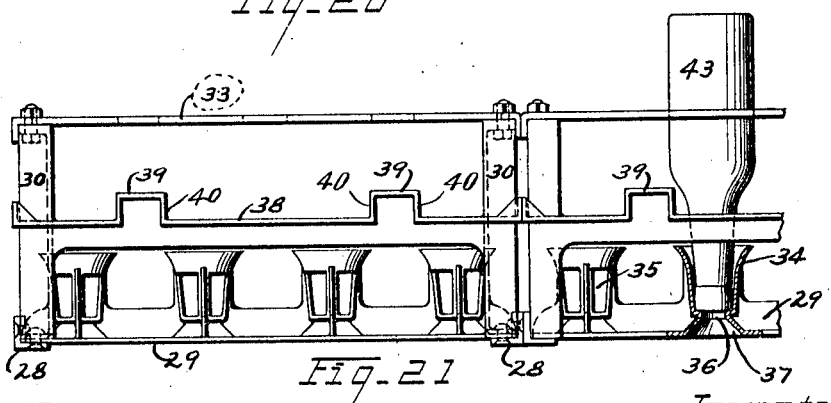
Figure 22:
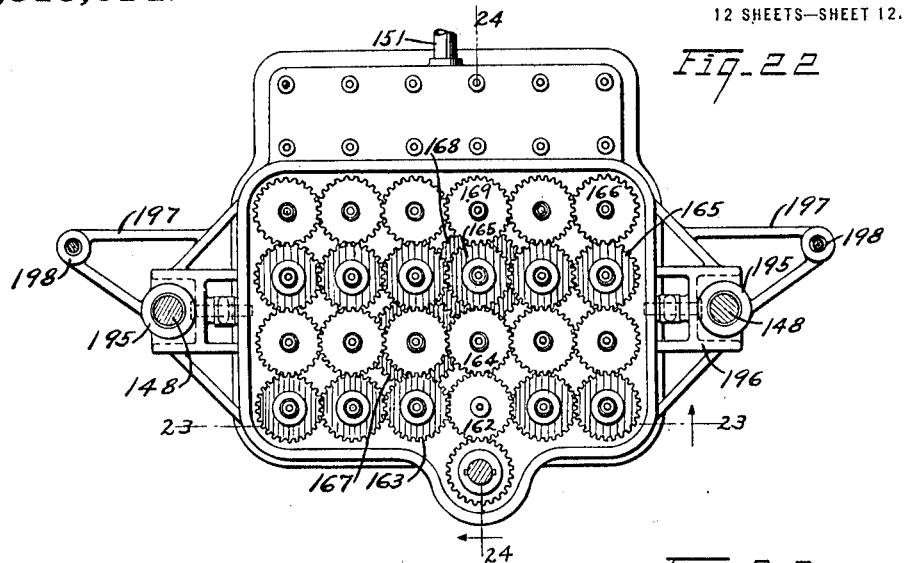
Figure 23:
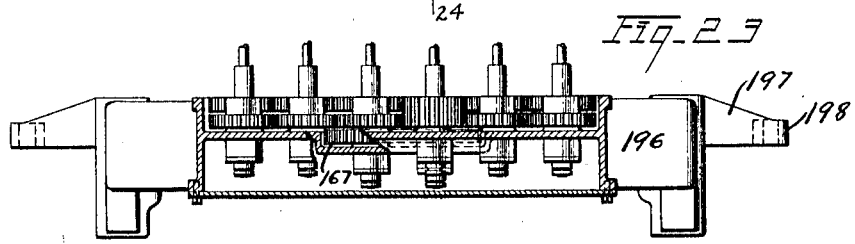
Figure 24:
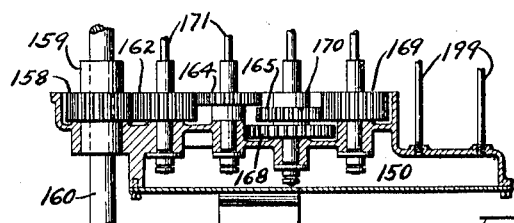

This invention relates to apparatus for cleaning bottles and similar articles and has for its general objects to provide an apparatus of this character which will be largely automatic in its operation and which will soak, clean, and rinse bottles in a very efficient manner. Further and more generally stated, the object of the invention may be defined as consisting of the combinations of elements set forth in the claims hereto annexed and illustrated, in one embodiment, in the drawings forming part hereof, wherein: Figure 1 represents a plan view of an apparatus constructed in accordance with my invention; Figs. 2 and 3 side elevations of the front and rear portions of the apparatus, respectively; Figs. 4 and 5 similar views of the opposite sides of the machine from Figs. 2 and 3, respectively; Figs. 6 and 7 longitudinal sectional views of the front and rear portions of the apparatus, respectively; Fig. 8 a transverse sectional view corresponding approximately to the line 8—8 of Fig. 4; Fig. 9 a front elevation of the final brushing and rinsing apparatus; Fig. 10 a detail in elevation of part of the mechanism for operating the nozzle boxes or heads in the part of the apparatus in which the bottles are preliminarily soaked and washed; Fig. 11 a detail in section of part of the construction shown in Fig. 10; Fig. 12 a detail in vertical section of part of the mechanism for operating the nozzle box; Fig. 13 a view, partly in elevation and partly in section, of the rear end of the preliminary soaking and washing apparatus; Fig. 14 a vertical sectional view taken through one of the strainers located in the pump suction pipe; Fig. 15 an enlarged vertical sectional detail taken through a brushing and a rinsing spindle and the associated parts; Fig. 16 a front elevation of one side of the preliminary soaking and washing apparatus, certain parts being shown in section; Fig. 17 a detail in section and Fig. 18 a detail in plan of the conveyer by which labels are removed from the apparatus; Fig. 19 a plan view with parts broken away, of one of the crates for the bottles which are to be treated in my apparatus; Fig. 20 an end elevation of one of said crates; Fig. 21 a side elevation of one of said crates with a portion of an adjacent crate; Fig. 22 a plan view of the brushing and rinsing box at the rear end of the apparatus, the cover plate and trough being removed; Fig. 23 a transverse sectional view through the box shown in Fig. 22; and Fig. 24 a sectional view taken at substantially right angles to Fig. 23.

The apparatus disclosed herein comprises, generally: a tank or receptacle having a plurality of compartments therein; a pair of rails in said tank or receptacle located above the compartments thereof; a nozzle box in each compartment and reciprocable toward and from the rails thereabove; connections for forcing cleansing and sterilizing liquid or solution into each of said boxes and through the nozzles thereof; connections (including pumps) for removing the cleaning or sterilizing liquid from each compartment and forcing it back into the nozzle box thereof; means for positively feeding or advancing bottle-crates along the rails with the mouths of the bottles presented toward the nozzles so that the nozzles may be inserted and discharged into said bottles as the latter are moved along the rails step-by-step; a conveyer in the tank or receptacle arranged beneath the rails and the nozzle boxes and adapted to collect and remove any labels that may be soaked from the bottles; a final washing station at the rear end of the tank for washing bottles with cold water; steam pipes for heating the liquid in the various compartments of the tank, with the exception of the last compartment; a brush at the discharge end of the tank for operating upon the bottoms of the bottles as they pass thereunder; a final internal brushing and rinsing apparatus at the discharge end of the tank and to which the bottle racks are fed (preferably by the same mechanism which feeds them through the tank or receptacle); with means for automatically brushing and rinsing the interiors of the bottles as they pass through the final apparatus. In addition to the parts thus generally enumerated, the apparatus comprises a number of details of construction which will be pointed out hereinafter in the specification and claims and which are believed to be of great utility and value in the practical operation of an apparatus of this character.

*Tank or receptacle.*

The tank or receptacle through which the bottles pass in transit to the final brushing and rinsing apparatus is preferably made of sheet metal and comprises side walls 1, a bottom wall 2, a front wall 3, a rear wall 4, and a plurality of transverse partitions 5 which extend upwardly from the bottom wall a sufficient distance and divide the tank or receptacle into a plurality of compartments A, B, C, and D. Each partition is provided with a slot 6 therein, above the level of the liquid which it is desired to maintain within the compartments, and similar slots 7 and 8 are provided in the front and rear walls of the tank or receptacle (see Figs. 6 and 7), said slots being in substantially the same horizontal plane and being provided for the passage of the endless conveyer, which will be described hereinafter. Each compartment is provided with an overflow pipe 9 projecting upwardly from the bottom of the tank. The tops of these pipes are in substantially the same horizontal plane, whereby the level of liquid in all of the compartments will be the same. The compartments A, B, C, and D are provided each with a pipe 10 through which steam from a pipe 11 and branches 12 may be supplied for the purpose of maintaining the liquid in each compartment at the desired temperature, each of the branches 12 being provided with a valve 13 whereby the amount of steam passing to the pipes 10 may be regulated. Each pipe 10 is preferably slotted, as shown at 10ª (Fig. 8), whereby the steam is introduced into the water in a noiseless manner. Each compartment is also provided with a connection 14 for liquid, each connection being provided with a valve 15. Beneath the slots 6 and 7 and above the overflow pipe 9, each compartment is provided with a sieve or strainer 16, which strainer is conveniently supported by means of angle irons 17 extending transversely with respect to said compartment. Above this strainer and above the slots 6 and 7, each compartment is also provided with downwardly and inwardly projecting flanges 18, the inner edges of which overlap the strainer 16, whereby any liquid that may run down the side or end walls of the tank will be directed upon the screen 16.

In addition to the overflow pipe, each compartment is provided with an opening in its bottom provided with an outlet controlled by a valve 19. For purpose of inspection, each side wall may be provided with panes 20 of transparent material, located near the upper part thereof and in proximity to the nozzle box. Each compartment will also be provided with suitable removable side plates 21, whereby access may be had to said compartment. The top of the tank or receptacle is conveniently closed by means of removable plates 22, each having hand grips 23 thereon, the edges of the plates being supported by means of longitudinally extending angle irons 24 and by transverse I-beams 25 (see Figs. 6 and 8).

The end walls 3 and 4 of the tank are provided each with an opening 26 and through the lower portions of these openings extend the rails 27 (see Figs. 6 and 8), said rails being preferably of angle iron construction.

As the apparatus is designed to treat bottles in crates and as the crates have certain features which coöperate with the tank and with the feeding apparatus (to be described hereinafter), one of such crates will now be described, particular reference being made to Figs. 6, 8, 19, 20 and 21.

Each crate is preferably made of metal and comprises a frame work having spaced top and bottom members with lateral supports (preferably intermediate the top and bottom members) by which the crate is sustained upon the rails above the tank compartments, and which coöperate with means for positively feeding the crates above the compartments and through the tank. The bottom of the crate is conveniently formed by angle iron rails 28 with cross bars 29, said cross bars being provided each with a plurality of mouth supports. The bottom member is connected to the top member by means of corner posts 30, and these posts are conveniently formed each with a flange 31 providing a support for a plate 32, the plate being provided with openings 33 in vertical alinement with the bottle mouth supports, which will now be described. Each bottle mouth support consists of an upwardly flaring cup 34, having a plurality of lateral openings 35 in its side wall above the perforated bottom 36, the central perforation of the bottom merging with a flaring or frusto-conical opening 37, the large end of which merges with the bottom of the cross bar 29. Intermediate of its top and bottom members each crate is provided with a pair of side rails 38 by means of which the crate is slidably supported upon the rails 27 in the tank, and each side rail 38 is provided with projections 39, which are preferably formed therewith and are provided each with vertical sides 40 that project at substantially right angles to the body of the rail, said sides forming engaging surfaces for the feeding means, to be described hereinafter. The top and bottom members of the crate are connected by means of stay bolts 41 each having a spacer sleeve 42 thereon.

In the operation of the apparatus, the crates are fed step by step through the tank, and the bottles 43, supported on these crates in inverted position, are internally and externally washed by jets of water delivered from nozzles carried by reciprocable nozzle boxes. These boxes will now be described.

Nozzle boxes.

Four nozzle boxes are shown in the drawings, one for each of the compartments A, B, C, and D. These boxes are all constructed and operated in substantially the same manner, so that a description of the construction and operation of one of these boxes will suffice for all. 44 denotes a metallic box, the upper wall of which is provided with a plurality of nozzles, 45, of such size as to enter the apertures 36 in the bottoms of the cups 34 and the bottles supported thereby and so spaced as to enter such apertures and bottles when a crate is moved in proper relation to and above the box and the box is elevated by suitable means, to be described. Each box is provided with a connection 46 for a flexible pipe 47, said pipe extending through one of the side walls 1 of the tank and being connected to the pressure side of a pump 48. The box 44 is provided with lateral extensions 49, each of which is provided with a rod 50 which is mounted in vertically alined sleeves 51 carried by a bracket 52. The box is reciprocated by means of a rock shaft 53 extending across and journaled in opposite sides of the tank, said shaft being provided with a pair of arms 54, each of which is connected to a link 55, the links being connected in turn to the lateral extensions 49 as shown at 56 (see especially Figs. 8, 11, and 12). The shaft 53 is rocked by mechanism to be described hereinafter. In the operation of the apparatus, the bottle racks are carried through the tank by a step-by-step movement, are subjected to a very thorough cleansing operation, and the labels are soaked off while passing through the tank and are removed from the tank by means which will now be described.

Label conveyer and remover.

Reference has been made heretofore to a label conveyer and remover as traveling through the slots 6, 7 and 8 and above the screen 16 and beneath the flanges 18. This label conveyer consists generally of a peculiarly constructed endless conveyer, which is especially adapted for the environment in which it is used. The conveyer consists generally of a plurality of perforated metallic plates, which are connected so as to form in effect an endless belt and which are arranged to receive the labels dropping from the bottles and to convey the same to a point outside of the tank, where they are removed. The conveyer is designated generally by the numeral 56 and comprises a plurality of perforated metallic plates 57, each of which has its opposite ends shaped to form a segment of a cylinder, as shown at 58, 59. The ends 58 and 59 will be given a curvature, the curved surfaces being substantially concentric with the pivotal connection between adjacent plates, but the surface 59 will be of sufficiently less diameter than the surface 58 to receive thereover the cylindrical end 58 of the next plate. This construction will be apparent from Figs. 17 and 18. Each plate is connected at its lateral edge to what is in effect a side plate of a chain link, said side plate being shown at 60 and having an inwardly directed flange 61 by means of which the plate 57 may be riveted thereto, as shown at 62. The vertical flange of each side plate 62 is preferably deflected outwardly at one end to receive between itself and the edge of the plate 57 the adjacent end of the next side plate. Coöperating with each side plate 60 is a side plate 63, and the ends of the side plates are connected by rivets 64 extending through the vertical portions thereof, there being spacing sleeves 65 interposed between said plates. The plates 60, 63 and the sleeves 65 form in effect chain links, which are connected to and movable with the plates 57 of the conveyer, the whole construction providing a perforated metallic conveyer which can be driven in substantially the same manner as a leather belt. The conveyer, as will appear more particularly from Figs 6 and 8, is located below the flanges 18, and, in its transit through the tank, the side edges are supported by the links resting upon the inwardly directed flanges 66 of a pair of angle iron rails, which rails are conveniently supported on the lower edges of the openings 6, 7, and 8 in the partitions 5, and the end plates 3 and 4, respectively. The tank is supported upon a base having a floor 67, and on this floor are mounted a plurality of rollers 68 on which the lower branch of the conveyer may rest, outside of the tank. The conveyer is driven by means of a pair of sprockets 69 mounted on a common drive shaft 70, the sprockets preferably having flanged rims provided with notches 71 therein adapted to receive the sleeves 65 of the links. The sprocket shaft 70 is driven by means which will be described hereinafter in connection with the various operating mechanisms for the apparatus. From the sprockets 69 the conveyer passes around a pair of sprockets 72 near the bottom of the tank, in position to direct the conveyer to the rollers 68 and thence, beneath the tank and between the same and the floor 67, to the rear of the tank, where it passes over the sprockets 73 and 74, which are so arranged as to direct the conveyer to the opening 8 in the front plate 4. As will appear from Figs. 2 and 6, the sprockets 72 are located somewhat to the rear of the sprockets 69, whereby practically all of the labels that may be on the conveyer will drop by gravity therefrom in passing between these sprockets. However, as there is liability that some of the material may adhere to the conveyer and not drop therefrom, I lead a pipe 75 forward from the compartment D at the rear of the tank and supply liquid therefrom to a branch 76 of said pipe which extends across that part of the conveyer which is traveling between the sprockets 69 and 72. This branch is provided with apertures 77 (see Fig. 16) which are adapted to discharge water through the perforations in the conveyer and loosen any labels, etc., that may adhere to the outer or conveying surface of the same. The end of this branch may be conveniently supported by means of a suitable bracket 78 carried by the front wall 3 of the tank (see Fig. 6).

*Apparatus for feeding crates.*

This apparatus comprises generally a pair of pawl carriers each located above a rail 27, with means for reciprocating the pawl carriers in such manner that the pawls may engage the projections or ratchet teeth 39 on the bottle racks and in this manner impart to the racks a step-by-step movement for the purpose of feeding them through the tank. These pawl carriers are shown in Figs. 3, 4, 6, 7, and 8 and comprise each a rod or strap 79 extending substantially the full length of the apparatus and provided with the pawls 80, which may be conveniently pivoted to plates 81 depending below the rods or straps. These pawls, as will appear from Fig. 8, are adapted to rest upon the horizontal flanges of the rails 27 and to engage the vertical faces of the tooth-like projections 39 on the crates. The pawl carriers are reciprocated by means of arms 82 projecting from rock shafts 83, which shafts are journaled in the sides of the tank. In the drawings, four such rock shafts are shown and one of these shafts is connected by means of an arm 84 with a link 85 and with a slotted arm 86 (see Fig. 5) which is pivotally supported at 87 above a drive shaft 88 which is driven by the main drive of the apparatus, which will now be described.

*Driving and operating mechanism.*

For the purpose of operating the various mechanisms referred to hereinbefore, I prefer to employ a pair of motors 89 and 90, each driving a shaft 91 and 92, respectively. Each shaft (91 and 92) drives two of the pumps 48, which pumps are adapted each to take liquid from a compartment of the tank and force the liquid through the pipes 47ª into the flexible pipes 47 that supply the nozzle boxes. 93 denotes the intake connection for each pump, and this intake connection (see particularly Figs. 8 and 14) communicates with a strainer which is conveniently formed by means of a cylinder 94 screwed into a flange 95 at the top of the receiving chamber 96, said chamber being provided with a plug 97 for the removal of sediment. A tubular connection 98 projects from the wall of the chamber 96 opposite the connection 93 and is provided, centrally within the flange 95, with an upwardly directed circular aperture 99 having upwardly projecting lugs 100 adapted to receive a ring 101 carried by the lower end of a wire gauze cylinder 102, said cylinder having the rings 101 103 at opposite ends thereof connected by longitudinal braces 104. The upper end of the strainer proper is connected to a cover 105 for the cylindrical casing 94, which cover may be detachably secured in place by means of the swinging bolts 106 having wing nuts 107 thereon adapted to engage lugs projecting from the cover. From the connection 98 the filtered liquid is conducted to the suction side of the pump 48.

The shaft 91 is provided with a pulley near the front end of the machine by which the large pulley 109 loosely mounted on a shaft 110 on the opposite side of the apparatus may be driven through a belt 111. This provides a speed-reducing drive from the shaft 91 to the pulley 109. The pulley 109 is adapted to be connected in driving relation to the shaft 100 by means of a cone-clutch 112, which may be operated, either by a lever 113 at the front of the machine, or by means of an operating handle 114 at the rear of the machine, (see Fig. 3) connected to lever 113 by means of a long rod 115. The shaft 110 is supported by brackets 116 projecting from the side of the tank. The shaft 70 is driven from the shaft 110 by means of suitable reduction gearing, the gearing shown being a worm 117 on the shaft 110 meshing with the worm gear 118 mounted on a shaft 119 (see Fig. 16). The shaft 119 is provided with a sprocket wheel 120 which is connected by a chain 121 with a similar sprocket wheel 122 on the shaft 70. By this construction the label conveyer is driven at the desired speed from the shaft 91. For the purpose of adjusting the tension of the conveyer, the journal boxes 70ª for the shaft 70 are mounted in slides 123 and are provided with adjusting screws 124.

The shaft 110 is provided near its rear end with a pulley 125, by means of which and a belt 126, a pulley 127, sprockets mounted on the pulley shaft 128 and a brush shaft 129 and the chain 130, a rotary brush 131 is driven and is adapted to operate on the bottoms of the bottles as they pass from compartment D to the final brushing and rinsing station.

For the purpose of operating the pawl carriers the arms 82 and the parts consecutively numbered up to and including 88 are provided. The shaft 88 is driven from the shaft 110 by means of a worm 132 on said shaft and a worm gear 133 on the shaft 88 (see Fig. 13). The slotted arm 86 is operated from the shaft 88 by means of a crank arm 134 projecting from the shaft and having a sliding connection with the arm 86 through the slot 86ª therein and the slide 135 carried by the end of the arm 134. By this construction a slow recovery stroke is imparted to the pawl carriers and a quick feeding movement is imparted to said carriers, while the parts are practically at rest during the greater part of the circular movement of the end of the crank arm whereby the nozzles carried by the boxes 44 may enter the bottles on the crates and be withdrawn therefrom before the next movement of the crates. This construction provides a very simple and efficient means for feeding the crates and bottles along the rails by an intermittent movement while enabling the crates to remain stationary a period of time amply sufficient to allow the nozzles to enter the mouths of the bottles and discharge the liquid into the same.

For the purpose of operating the rock shafts 53, the shaft 88 on the side of the apparatus opposite the shaft 110 is provided with an eccentric 136 and an eccentric strap 137 connected by a rod 138 with a bell-crank lever 139 (see Figs. 2, 3, 10 and 13). The upper end of the bell crank lever is connected to a rod 140 which in turn is connected to the upper arms 141 of the bell crank levers, each of which is rigidly connected to one of the shafts 53. The other arm 142 of each lever is provided with a weight 143, the purpose of these weights being to counterbalance the pull upon the eccentric and its strap during the raising and lowering of the nozzle boxes.

*Internal brushing and cleaning mechanism.*

The rails 27 extend rearwardly from the tank and in operative relation to the internal brushing and rinsing mechanism. This mechanism comprises generally a vertically reciprocable box to which rinsing and cleaning liquid is supplied, with a plurality of hollow spindles carried by said box, some of the spindles being provided with gears for rotating the same; a cross head or frame having tubular guides for the spindles and adapted to abut against and engage the flaring opening 37 in the bottom of the crates; also a bottle bottom clamping device, with connections for reciprocating the combined spindle and gear box and for moving the cross head and clamping device apart to permit the intermittent advance of the crates as the combined gear and spindle box is lowered. The construction referred to is shown in Figs. 1, 3, 5, 7, 9, 15, 22, and 24.

The interior brushing and rinsing mechanism comprises a base 144 from which project the upright frames 145, said frames being preferably of inverted U-shape each having a centrally arranged upwardly projecting post 146 at the top with a transversely extending frame 147 connecting the upper ends of said posts. 148 denotes a pair of upright guide rods having their lower ends supported by the base 144 and their upper ends supported by sleeves 149 carried by the top of each frame 145. These rods 148 form guides for the gear and spindle box during its reciprocations. This box will now be described.

The box is denoted generally at 150 and is provided with a connection 151 extending from the bottom thereof, which may be conveniently connected to a flexible supply pipe 152, said flexible supply pipe communicating at its outer end with a rigid pipe 153 having a valve 154 therein, said valve being automatically opened and closed in connection with the reciprocation of the box 150, by means to be described hereinafter. The top of the combined gear and spindle box, as will appear more particularly by reference to Figs. 7 and 15, is provided with an upwardly projecting flange 155, whereby it forms a trough for collecting water flowing down from the bottles, the trough being provided with a discharge pipe 156, the lower end of which telescopes within a large waste pipe 157. At the front of the gear and spindle box is located a drive gear 158, said gear being provided with an elongated hub 159 which is slidably connected with a vertical drive shaft 160, as by means of a long key-way (not shown), the upper end of the shaft being journaled in a sleeve 161, which may be carried by the spindle guide frame 200 which is immediately beneath the crates. The gear 158 is a wide faced gear and meshes with a similar wide-faced gear 162. The gear 162 is one of a series of intermeshing gears, six such gears being shown. Each of the other gears 163 in this series is a narrow faced gear, the gears of this series which are adjacent to the gear 162 meshing with the lower portion of the gear 162, and all of the gears of this series other than the gear 162 being in substantially the same horizontal plane.

The gear 164 of the next series is also a narrow-faced gear but meshes with the upper portion of the gear 162, all of the gears of this series being narrow-faced gears and being in substantially the same plane as the gear 164 and being located above the gears 163. The gears in the remaining series are staggered in like manner, the gears 165 in the next series being located below the gears 166 in the last series. For the purpose of distinguishing readily between the upper and lower series of gears, the gears located in the lower horizontal plane are shaded on Fig. 22, while those in the upper series are unshaded. The gears 165 are driven from the preceding series by means of large intermediate gears 167 and 168 mounted on diagonally arranged spindles of the series 164 and 165, respectively. The gears 166 of the last series are driven from the gear 168 by means of a wide faced gear 169 on one of the gear spindles meshing with a gear 170 which is located on the same shaft or spindle with but above the gear 168. The purpose of this gear arrangement is to avoid friction by employing intermediate gearing between the various series.

Each gear, with the exception of the driving gear 158, is provided with a hollow spindle 171, the bottom of which spindle communicates with the box 150 and receives a supply of liquid therefrom. Each spindle 171 is provided at its upper end with a brush 172 which brush may be of any approved type adapted to clean the interior of the bottle. The lower end of each spindle is threaded into the upper end of the perforated hub of its gear. Into the lower end of said hub, there is threaded a pipe 173, said pipe communicating with the box. To the bottom of the sleeve 174 surrounding the gear hub, there is secured a plate 175, the plate being provided with an internally threaded sleeve 176 which is adapted to receive a packing gland 177 which is adapted to coact with packing material 177ª surrounding the pipe or tube 173.

The box 150 is reciprocated by a rock shaft 178 having a pair of arms 179 thereon, said arms being each connected at one end to the box by means of a link 180 and each having a counterbalancing weight 181 at its opposite end. The shaft 178 is rocked by means of an arm 182 connected to the shaft and having a slot near its outer end to which there is adjustably connected a connecting rod or pitman 184, the opposite end of which is connected to a crank 186 mounted on the shaft 88. It will be apparent that the reciprocation of the box 150 and of the nozzle box in the tank will be coincident, since both are reciprocated by a revolution of the shaft 88. The same is true of the feeding of the crates along the rails, the movement being imparted to the crates for each revolution of the shaft 88 as heretofore explained. The weights 181 counterbalance the box 150 and relieve the shaft, crank and connecting rod of undue strain.

The gear shaft 160 is driven from the shaft 92 by means of a pulley 187 on the shaft 92, a belt 188 and a pulley 189 on the shaft 190 having a beveled gear 191 at its rear end meshing with a beveled gear 192 on the shaft 160.

For the purpose of controlling the water supply to the box 150, the valve 154 is provided with an arm 193 which is connected by a link 194 to the slotted arm 182 whereby, as the box 150 is raised, the valve will be opened and when the brushes and nozzles are withdrawn from the bottles by the descent of the box 150 the liquid supply will be cut off. The box 150 is guided during its reciprocating movement by sleeves 195 projecting therefrom mounted upon the rods 148, the sleeves being carried by brackets 196. The box 150 is also provided with outwardly projecting brackets 197 each having a collar 198 at its outer end, for a purpose to be described hereinafter.

In the drawings shown herein, four series of gears and spindles are provided, there being six such spindles in each series. It will be evident, however, that the number of gears in each series, as well as the number of series, may be varied to suit varying conditions of use. In addition to the gears and spindles, the box 150 is provided with series of rinsing nozzles or spindles 199, two such series being shown, although the number may be varied as desired. The hollow spindles 199 are merely rinsing spindles and are located at the rear end of the box and give a final rinsing to the bottles which have been internally brushed by the combined rinsing and brushing spindles.

Above the box 150 and below the rails 27 is located a frame 200 having tubular guides through which the spindles 171 and 199 pass, for the purpose of directing the spindles, and particularly the brushes, into the bottles in the crates thereabove and for holding the brushes, after the spindles have been withdrawn from the bottles, in proper condition to reënter the bottles. The frame 200 is provided with a plurality of tubes or sleeves 201, which are conveniently supported in openings formed in cross-bars 202, each sleeve having a frusto-conical end 203 adapted to fit within the frusto-conical opening 37 in the bottom of the crate thereabove, the body of the sleeve 201 being of considerably less diameter than the head 203, whereby the sleeves may pass through the openings in the cross bars 202 but may be sustained by the engagement of the heads 203 with such bars. The sleeve 201 is considerably larger than the diameter of the spindle 171 but is tapered at its upper end, as shown at 204, to form a frusto-conical guide for the brush 172 and compress the same so that it may readily enter the bottle mouth thereabove through the opening 36, the upper end of the guide being of the same diameter as the opening 36 thereabove. The frame 200 is yieldingly supported by means of springs 205, which are adjustably suspended by bolts 206 from projections 207 carried by the rods 146. The lower ends of the springs are connected to the lateral extensions 208 projecting from the frame 200, each extension being provided with an aperture for the reception of a rod, the purpose of which will be described hereinafter.

Above the rails 27, and adapted to engage the bottoms of the bottles during the operation of the brushing and rinsing spindles, is a clamping frame 209. This frame is provided with a plurality of bottom clamps, one for each brushing and rinsing spindle carried by the box 150. Each bottle bottom clamp consists of a sleeve 210 (see Fig. 15) extending through a guide 211 on the frame 209 and having at its top a collar 212 by which it may be supported from the frame. The bottom of each sleeve 210 is provided with a frusto-conical cup 213, which is adapted to receive therewithin the bottom of the subjacent bottle. I prefer to employ a spring 214 surrounding each sleeve 210 and bearing at one end against the cup 213 and at its other end against the frame, whereby said clamps are yieldingly pressed against the bottoms of their respective bottles.

The frame 209 is adapted to reciprocate to a slight extent and is conveniently guided during its reciprocating movements by rods 215 carried by and extending through sleeves 216 formed in the cross bar 147. The frame 209 is suspended by means of links 217, connected each to an arm 218 of a bell crank lever, the shaft 219 of which is journaled in a bracket 220 projecting upwardly from the frame 147. The other arms 221 of the bell crank levers project upwardly and are connected by means of a spring 221ª and turnbuckles 222, the construction providing a yielding support for the frame 209. 223 denotes arms projecting from the shafts 219 in substantially the opposite direction from the arms 218. From the outer end of each arm 223 depends a rod 224, which passes through the apertures formed in the outer end of the brackets 208 and 197 of the frame 200 and box 150, respectively. A short distance above the former aperture in the bracket 208, each rod 224 is provided with a collar 225 and, at a considerable distance below the aperture in the box 150 with a washer 226. The collars 225 are adjustable along the rod 224, each being provided with a set screw to clamp it to its rod, while the washers 226 are adjustable along the respective rods by means of nuts 227. By this construction, when the box 150 moves downwardly and is near the lower end of its stroke, the projections engage the washers 226 and pull downwardly upon the rods 224. The first movement of these rods elevates the frame 209 and moves the bottle clamps away from the bottles, and a slightly further movement in the same direction causes the collars 225 to engage the frame 200 and move the same downwardly against the action of the springs 205. This permits the bottle crate to be advanced the next step toward the rear or discharge end of the apparatus.

It will be noted that the brush 131 is located in a housing, and this housing is provided with a vent 228 through which steam may escape.

With the parts constructed as described, the operation briefly is as follows:

The crates are applied to the rails 27 at the front end of the tank and will be pushed inwardly by the operator until the projections or ratchet teeth 39 are in position to be engaged by the pawls 80.

It will be noted that the distance between the ratchet teeth 39 is substantially the distance that the pawl carrier rods 79 will be reciprocated by the shaft 88 and the swinging arms 82. By an inspection of Fig. 21, it will be observed further that the distance between the teeth on adjacent racks is one-half the distance between teeth on the same rack, whereby the distance between the ratchet teeth in an unbroken series of racks extending entirely through the tank will be practically uniform. It will be also noted that the distance between adjacent ratchet teeth is such that the crates are fed, for each stroke of the pawl carriers, the distance between alternate bottle series. Thus, with the six transverse series of nozzles on each nozzle box 44, each bottle in a crate will be given three cleansing operations for each nozzle box during its transit through each compartment of the tank. It will be understood, of course, that the shafts are so timed that the nozzles will be withdrawn from the bottles, the bottle crates then advanced by the pawls, the nozzles inserted into the bottles during the time that the crates are at rest and withdrawn before the crates are advanced, this operation being repeated during the progress of the crates through the tank. For clearness of illustration, the crates are not shown in a continuously contacting series throughout the tank, in Fig. 6, although this arrangement is preferred and is indicated by the arrangement of the crates in compartment B. By having a continuous train of crates in the tank, it will not be necessary to provide a large number of pawls 80. In fact, only a sufficient number of such pawls will be provided to relieve the pawls of excessive work and, in the embodiment shown herein, but five (5) pawls are shown on each carrier within the entire tank, with one pawl for feeding the crates to the final internal brushing and rinsing apparatus. The rear ends of the pawl carriers 79 are supported by arms 82ª similar to the arms 82 in the tank and having their lower ends pivotally connected to the side frames 145.

As the bottle crates are fed through the tank, the bottles are subjected to a plurality of treatments (at least three) in each compartment. The bottles are preferably subjected to the action of different solutions having different temperatures in the different compartments, the solution being heated in each compartment by the steam pipe therein and being forced through the nozzle boxes and nozzles into the bottles. In moving from one station to another, the outside of each bottle is necessarily subjected to the action of the heated liquid, with the result that the labels and other material on the outside are loosened and drop down upon the conveyer 56. All the material which cannot pass through the perforations in the conveyer is carried to the front of the tank and either drops off the conveyer between the sprockets 69 and 72 or is washed off by the liquid forced through the jets in the pipe 76. The screen 16 collects any finer sediment that may pass through the conveyer and prevents the same from getting into the solution in each compartment. Owing to the manner of driving the pawl-carriers, the crates are given a long dwell above their nozzle boxes (while the crank 134 is passing its lower center), while the time occupied in advancing the crates is relatively short (while the crank 134 is passing the upper center) there being considerable lost motion on the feeding stroke of the carriers.

Should any sediment enter the compartments of the tank, this will be effectively removed between each compartment and its pump by the strainer, the casing of which is indicated at 94. The compartment D is one in which the liquid is preferably used in an unheated condition, and no steam pipe need be provided for this compartment.

As the crates are fed through the rear end of the tank, they will be subjected to the action of the brush 131. From this station they are conveyed to the final internal brushing and rinsing mechanism. The parts are so timed that, as the crates are fed beneath the front end of the frame 209, this frame will be elevated and the frame 200 depressed to permit the crate to enter freely therebetween. When the crate comes to rest, the frame 209 will be lowered and the frame 200 elevated by their respective springs, to clamp the first two series of bottles between the corresponding bottom clamps and the conical seats 203. The box 150 will be reciprocated and the rapidly rotating brushing spindles 171 will enter the interiors of two series of bottles, rinsing and brushing the same. The box 150 will be retracted, the spindles withdrawn from the bottles, and the brushes held in contracted position in the upper portions 204 of the guides 201. The frames 200 and 209 will be separated a short distance and the crate will then be advanced another step, bringing the first four series of bottles above the brushing and rinsing spindles.

The operation just described will be repeated and the crate will then be advanced to bring the first two series of bottles above the rinsing spindles 199. The crates will be removed from the rails 27 when the final cleaning is accomplished.

By the apparatus described herein, it is possible to repeatedly use the cleansing and sterilizing solution in each compartment; to keep the labels out of the solution and, in fact, to remove them from the apparatus; to make the feeding of the bottles through the apparatus automatic; and, generally, to produce an apparatus which is of great capacity and which will nevertheless accomplish the cleansing of the bottles in an extremely efficient manner.

I claim:

1. In an apparatus of the character set forth, the combination of a tank having a plurality of compartments for cleansing liquids, a track above said compartments, a plurality of crates adapted to be mounted on said track and to support bottles in an inverted position, a nozzle-carrying device in each compartment, means for supplying liquid from each compartment to the corresponding device and for causing the liquid to return to such compartment, means for reciprocating said devices to insert the nozzles into and withdraw the same from the bottles thereabove, and mechanism operating to advance the crates along the track after the withdrawal of the nozzles from the bottles thereon.

2. In an apparatus of the character set forth, the combination of a tank, a track in operative relation to said tank, a bottle supporting device adapted to rest upon said track and having ratchet teeth thereon, pawl carriers, gravity pawls connected to said carriers and adapted to engage said teeth, means for operating the pawl carriers to impart an intermittent movement to the device, and means for supplying cleansing fluid to the bottles on the device while the crate is at rest.

3. In an apparatus of the character set forth, the combination of a tank having a plurality of compartments therein, a track extending through said tank and above the compartments, a perforated endless conveyer extending through said tank below said track and above the bottoms of said compartments, bottle crates adapted to rest on said track, a liquid supply communicating with each compartment, means for forcing liquid from each compartment into the bottles in said crates, means for discharging all liquid thus supplied upon the upper surface of the conveyer, and a screen interposed between the conveyer and the liquid forcing means.

4. In an apparatus of the character set forth, the combination of a tank having a plurality of compartments therein, a track extending through said tank above the compartments thereof, an endless conveyer also extending through said tank above the bottoms of the compartments, means for supplying liquid to each of said compartments, a spray box for each of said compartments and located below the track, means for forcing liquid from each compartment to its spray box, means for collecting upon the conveyer surface the liquid discharged from the spray box, and a screen in each compartment located below the conveyer.

5. In an apparatus of the character set forth, the combination of a tank, a bottle supporting means above the bottom of the tank, a movable conveyer below said supporting means, a spray box located below the track and above the conveyer, means for forcing liquid to the spray box, and downwardly and inwardly projecting flanges carried by the tank walls and adapted to collect upon the conveyer the liquid discharged from the spray box.

6. In an apparatus of the character set forth, the combination of a track, a plurality of crates adapted to rest upon the track and each having ratchet teeth thereon, said crates being adapted to abut against each other, pawl carriers having gravity pawls adapted to engage the ratchet teeth and being spaced apart a greater distance than the length of the crates, means for reciprocating said pawl carriers, and means for supplying liquid to the bottles on the crates.

7. In an apparatus of the character set forth, the combination of a track, a crate having side rails adapted to rest upon the track, and each rail having a ratchet tooth thereon, pawl carriers having gravity pawls adapted to engage said ratchet teeth, means for reciprocating said pawl carriers, and means for supplying liquid to the bottles on the crate.

8. In an apparatus of the character set forth, the combination of a tank, a track above the bottom of said tank, a plurality of bottle supporting crates adapted to rest upon said track, said crates having teeth or projections, a pair of pawl carriers having each a plurality of pawls adapted to engage the teeth or projections on the crates, and means for reciprocating said pawl carriers, said means comprising a shaft, a crank connected to said shaft, an arm pivoted at one end and having a slot, a sliding connection between the end of the crank and said slot, a link connected to said arm, a rock shaft connected to said pawl carriers, and a connection between said link and said rock shaft.

9. In an apparatus of the character set forth, the combination of a tank, a track above the bottom of said tank, a plurality of bottle supporting crates adapted to rest upon said track, said crates having teeth or projections, a pair of pawl carriers having each a plurality of pawls adapted to engage the teeth or projections on the crates, and means for reciprocating said pawl carriers, said means comprising a shaft, a crank connected to said shaft, a pivoted arm, a sliding connection between the crank and said arm, a link connected to said arm, a rock shaft connected to said pawl carriers, and a connection between said link and said rock shaft.

10. In an apparatus of the character set forth, the combination of a tank, a track extending through said tank, said tank being provided with a plurality of compartments therein, a plurality of bottle crates adapted to rest upon the track, means for feeding the crates intermittently along the track, means for supplying liquid from the compartments to the bottles, an apparatus for internally brushing and rinsing the bottles, located at the rear of the tank and to which said track extends, and means for feeding the crates along the track above the compartments thereof and in operative relation to the brushing and rinsing apparatus.

11. In an apparatus of the character set forth, the combination of a tank, a track extending above the bottom of the tank, a bottle crate adapted to rest upon the track, means for feeding the crate intermittently along the track, means for supplying liquid to the bottles, an apparatus for internally brushing the bottles, located at the rear of the tank and to which said track extends, and means for feeding the crate along the track and in operative relation to the brushing apparatus.

12. In an apparatus of the character set forth, the combination of a tank having a plurality of compartments therein, means for supplying liquid to said compartments, means for heating liquid in said compartments, an internal brushing and rinsing mechanism located at the rear of said tank, a track extending through said tank and to said mechanism, a plurality of bottle crates adapted to rest upon said track, means for feeding the crates along the track, means for supplying liquid from the compartments to the bottles in the crates, a label conveyer located below the track in the tank, an internal rinsing and brushing device in operative relation to the track, and means for reciprocating said device toward and from the track.

13. In an apparatus of the character set forth, the combination of a tank having a plurality of compartments therein, means for supplying liquid to said compartments, means for heating the liquid in said compartments, a track extending above said compartments and beyond said tank, a plurality of bottle crates adapted to rest upon the track, means for intermittently moving the crates along said track, a nozzle box corresponding to each compartment, connections for supplying liquid from each compartment to its nozzle box, means for reciprocating said boxes toward and from the track, an external brushing apparatus located adjacent to the rear end of the tank, an internal brushing and rinsing mechanism located at the rear of the tank and in operative relation to which the track extends, said mechanism comprising a box having a plurality of hollow brush spindles thereon, means for rotating said spindles, means for supplying liquid to said box and the spindles carried thereby, and means for reciprocating said box toward and from the track.

14. In an apparatus of the character set forth, the combination of a tank having a plurality of compartments therein, a track extending through said tank and above said compartments, crates adapted to rest upon said track, means for intermittently advancing the crates along said track, a plurality of nozzle boxes, one for each compartment and means for reciprocating said boxes toward and from the crates on the track, said means comprising a shaft, an eccentric thereon, a bell crank lever, means connecting one arm of said lever to the eccentric, a rod connected to the other arm of the lever, a rock shaft for each nozzle box, an arm connecting each shaft with said rod, a bell-crank lever also connected to each shaft and having one arm connected to the rod, and a counterweight on the other arm adapted to counterbalance the nozzle box.

15. In an apparatus of the character set forth, the combination of a tank, a track above the bottom of the tank, a crate adapted to rest upon said track, means for intermittently advancing the crate along said track, a nozzle box, and means for reciprocating said box toward and from the crate, said means comprising a rock shaft, an arm connecting said shaft with said box, and an arm projecting from said shaft in the opposite direction from the former arm, and a counterweight on the latter arm.

16. In an apparatus of the character set forth, the combination of a tank having a plurality of compartments therein, a track in said tank extending above said compartments, a plurality of crates adapted to rest on said track, means for intermittently advancing the crates along said track, a nozzle box for each compartment, means for supplying liquid to each nozzle box, means for moving the nozzle box toward and from the track, said means comprising a drive shaft, a rock shaft for each of the nozzle boxes, connections between each shaft and a box, connections between the drive shaft and the nozzle-box shafts for rocking the latter, and means for counterbalancing each nozzle box.

17. In an apparatus of the character set forth, the combination of a tank, a track therein, a plurality of nozzle boxes in operative relation to said track, a plurality of bottle crates adapted to rest upon the track, means for intermittently advancing the crates along the track, means for simultaneously moving the boxes toward and from the track, said means comprising pivotally supported arms connected to the boxes, means for rocking said arms, and means extending in opposite direction from said arms and adapted to counterbalance the same and the nozzle boxes carried thereby.

18. In an apparatus of the character set forth, the combination of a tank, means for supporting a bottle crate therein, a nozzle box, means for reciprocating the same toward and from the crate, said means comprising a rock shaft, arms carried by said shaft and connected to opposite end portions of the box, rods carried by such end portions of the box, and bracket sleeves mounted on the inner sides of the tank and adapted to receive said rods.

19. In an apparatus of the character set forth, the combination of a bottle carrying device, means for moving said device intermittently, a liquid receiving box, a plurality of spindles carried thereby and located at one side of the bottle-carrying device, a frame interposed between said box and said device, said frame having tubular guides for the spindles, a frame on the opposite side of said device from the box and having a plurality of clamps for the bottoms of bottles on the said device, means yieldingly supporting said frames, means for reciprocating the box, and means operative by the reciprocation of the box for moving said frames apart when the box is moved away from the bottle supporting device.

20. In an apparatus of the character set forth, the combination of a bottle supporting device, means for moving the same intermittently, a box having a plurality of spindles thereon located beneath said device, a frame interposed between the box and the device and having a plurality of tubular guides for the spindles, a frame located above the said device and having a plurality of clamps adapted to engage the bottoms of the bottles, springs suspending said frames, means for reciprocating the box toward and from the device, and means for automatically moving said frames apart against the action of said springs when the box is operated to withdraw the spindles from the bottles.

21. In an apparatus of the character set forth, the combination of a bottle supporting device, means for moving the same intermittently, a box having a plurality of spindles thereon located at one side of said device, a frame interposed between the box and the device and having a plurality of tubular guides for the spindles, a frame on the opposite side of the device from the former frame and having a plurality of clamps adapted to engage the bottoms of the bottles, springs suspending said frames, means for reciprocating the box toward and from the device, and means for automatically moving said frames apart against the action of said springs when the box is operated to withdraw the spindles from the bottles.

22. In an apparatus of the character set forth, the combination of a support, a bottle crate adapted to be moved along said support, means for intermittently advancing the crate along said support, said crate having a plurality of perforated supports for the mouths of bottles, the perforations of which communicate with flaring or frusto-conical recesses, a box having a plurality of spindles thereon and located at one side of said support, a frame interposed between the box and the crate and having a plurality of tubular guides corresponding in position to the bottle mouth supports in the crate and each tubular guide having frusto-conical projections adapted to enter the corresponding recesses in the crate, a frame having a plurality of clamps thereon adapted to engage the bottoms of the bottles in the crate, means for reciprocating the box toward and from the track, and means for separating said frames when the spindles are withdrawn from the bottles.

23. In an apparatus of the character set forth, the combination of a support, a bottle crate adapted to be moved along said support, means for intermittently advancing the crate along said support, said crate having a plurality of perforated supports for the mouths of bottles, the perforations of which communicate with flaring or frusto-conical recesses, a box having a plurality of brush spindles thereon and located at one side of said support, a frame interposed between the box and the crate and having a plurality of tubular guides corresponding in position to the bottle mouth supports in the crate and each tubular guide having frusto-conical projections adapted to enter the corresponding recesses in the crate, said guides having their bores tapered and contracted toward the frusto-conical ends thereof, a frame having a plurality of clamps thereon adapted to engage the bottoms of the bottles in the crate, means for reciprocating the box toward and from the track, and means for separating said frames when the spindles are withdrawn from the bottles.

24. In an apparatus of the character set forth, the combination of a support, a bottle crate movable along said support, means for intermittently advancing the crate along the support, said crate having a plurality of perforated bottle mouth supports at its bottom with a frusto-conical or flaring recess extending downwardly from the perforation to the bottom of the crate, a box, means for supplying liquid thereto, a plurality of brushing and rinsing spindles carried by the box and corresponding to the bottles on the crate, a frame interposed between the box and the track and having a plurality of tubular guides for the spindles, each guide having a frusto-conical upper end adapted to enter the corresponding seat or recess in the bottom of the crate and also having the upper portion of its bore tapered or frusto-conical to compress the brush when withdrawn thereinto, means yieldingly holding the upper ends of the guides in the tapered recesses of the crate, means for reciprocating the box toward and from the support and the crate thereon, and means operative by the withdrawal of the spindles from the bottles on the crate for automatically moving the frame downwardly to disengage the same from the crate.

25. In an apparatus of the character set forth, the combination of a support, a bottle crate movable along said support, means for intermittently advancing the crate along the support, said crate having a plurality of perforated bottle mouth supports at its bottom with a frusto-conical or flaring recess extending downwardly from the perforation to the bottom of the crate, a hollow box, means for supplying liquid thereto, a plurality of brushing and rinsing spindles carried by the box and corresponding to the bottles on the crate, a frame interposed between the box and the track and having a plurality of tubular guides for the spindles, each guide having a frusto-conical upper end adapted to enter the corresponding seat or recess in the bottom of the crate and also having the upper portion of its bore tapered or frusto-conical to compress the brush when withdrawn thereinto, means yieldingly holding the upper ends of the guides in the tapered recesses of the crate, means for reciprocating the box toward and from the support and the crate thereon, a bottle-bottom clamping device above the track, and means operative by the withdrawal of the spindles from the bottles for moving the frame and clamping device away from the support.

26. In an apparatus of the character set forth, the combination of a box, means for supplying liquid thereto, a plurality of nozzles or spindles carried by the box, a bottle carrying device above said box, a frame above said device having a plurality of bottle bottom clamps, bell crank levers having vertically extending arms, a spring connecting said arms, links suspending the frame from the other arms of the levers, means for reciprocating the box toward and from the device, and connections operative by the movement of the box away from the device for rocking the bell crank levers and moving the frame away from the bottle carrying device.

27. In an apparatus of the character set forth, the combination of a bottle carrying device adapted to support a plurality of bottles, a plurality of series of spindles, a box carrying the same, means for supplying liquid to the box, the spindles of each series being provided with intermeshing gears, a drive shaft, a gear on said shaft having a sliding connection therewith and adapted to mesh with a drive gear of one of the series, connections between said drive gear and the drive gear of the next series, intermediate gearing connecting one of the spindles of the last mentioned series with the next series, intermediate gearing connecting one of the spindles of the last mentioned series with the next succeeding series, and means for reciprocating the box toward and from the bottle carrying device.

28. In an apparatus of the character set forth, the combination of a bottle carrying device adapted to support a plurality of bottles, a plurality of series of spindles, the spindles of each series being provided with intermeshing gears, a drive shaft, a gear on said shaft adapted to mesh with a drive gear of one of the series, connections between said drive gear and the drive gear of the next series, and intermediate gearing connecting one of the spindles of the last mentioned series with a spindle of the next following series, and means for reciprocating the box toward and from the bottle carrying device.

29. An apparatus of the character set forth, the combination of a bottle carrying device, a box, a plurality of brushing and rinsing spindles carried thereby, a liquid supply pipe having a valve therein, a flexible connection extending from the valved portion of the supply pipe to the box, a rock shaft, a connection between the same and the box, an arm for rocking said shaft, and a link connecting said arm and valve.

30. In an apparatus of the character set forth, the combination of a bottle carrying device, means for moving the same intermittently, a box having a plurality of liquid discharging devices, means including a flexible pipe for supplying liquid to said box, means for reciprocating the box toward and from the bottle carrying device, a trough on top of the box, a waste pipe connected therewith and projecting downwardly therefrom, and an enlarged waste outlet pipe within which the former pipe telescopes.

31. In an apparatus of the character set forth, the combination of a plurality of compartments for cleansing fluid, a track extending above said compartments, a bottle-supporting crate movable along said track and having projections thereon, pawl carriers having pawls adapted to engage the projections on the crates, and devices for reciprocating said carriers comprising means for imparting to the devices a fast feed stroke and a slower return stroke for the purpose described.

32. In an apparatus of the character set forth, the combination of a track having a plurality of compartments therein for cleansing fluid, said compartments being formed by upright partitions in said tank, said partitions having registering slots therein; a bottle supporting crate movable along said track, washing devices located below the track in each compartment, means for forcing liquid from each compartment to the device located therein, and a label conveyer extending through said tank and through said slots in the partitions for removing labels and other foreign matter washed from the bottles.

In testimony whereof, I hereunto affix my signature in the presence of two witnesses.

JOHN R. GRUETTER.

Witnesses:
BRENNAN B. WEST,
CHAS. C. WATT.

Copies of this patent may be obtained for five cents each, by addressing the "Commissioner of Patents, Washington, D. C."